United States Patent [19]

Garrett

[11] Patent Number: 4,458,404
[45] Date of Patent: * Jul. 10, 1984

[54] METHOD OF MAKING SLEEVED DRILL PIPE

[75] Inventor: William R. Garrett, Houston, Tex.

[73] Assignee: Smith International, Inc., Newport Beach, Calif.

[*] Notice: The portion of the term of this patent subsequent to Oct. 23, 1996 has been disclaimed.

[21] Appl. No.: 367,202

[22] Filed: Apr. 12, 1982

Related U.S. Application Data

[60] Continuation of Ser. No. 183,290, Sep. 2, 1980, abandoned, which is a division of Ser. No. 010,235, Feb. 8, 1979, abandoned, which is a continuation-in-part of Ser. No. 818,672, Jul. 25, 1977, Pat. No. 4,146,060.

[51] Int. Cl.³ .................. B21D 39/00; B23P 19/04
[52] U.S. Cl. ................. 29/455 R; 29/460; 228/175; 228/176; 264/262
[58] Field of Search .............. 29/455 R, 458, 460; 308/4 A; 264/262; 228/175, 176

[56] References Cited

U.S. PATENT DOCUMENTS

| | | | |
|---|---|---|---|
| 2,180,695 | 11/1939 | Rembert | 264/262 |
| 2,295,873 | 9/1942 | Stone | 29/460 UX |
| 2,295,874 | 9/1942 | Stone et al. | 29/460 UX |
| 3,195,927 | 7/1965 | Kimbrell | 29/458 X |
| 3,411,837 | 11/1968 | Schellstede | 308/4 A |
| 4,153,656 | 5/1979 | Bunyan | 264/262 X |
| 4,171,560 | 10/1979 | Garrett | 29/455 R |
| 4,175,311 | 11/1979 | Bunyan | 29/455 R X |

OTHER PUBLICATIONS

Industrial Products Division, United States Pipe and Foundry Co., Oct. 1975, pp. 20, 21.

Primary Examiner—Charlie T. Moon
Attorney, Agent, or Firm—Murray Robinson; Ned L. Conley; David A. Rose

[57] ABSTRACT

A one-piece metal wear sleeve, circumferentially homogeneous, is secured by epoxy to the outer periphery of a drill pipe. The inner diameter of the sleeve is less than the outer diameter of tool joints at the end of the drill pipe. The sleeve is centrifugally cast of two materials, including a tough, strong material such as an iron alloy at its inner portion and a hard non-abrasive wear resistant material such as alloy steel at its outer portion to resist wear on the sleeve, e.g. when it is run in open hole or in a cased hole. The outer portion is homogeneous and has a smooth outer periphery so as to reduce wear on the casing when the pipe is run in cased hole.

1 Claim, 3 Drawing Figures

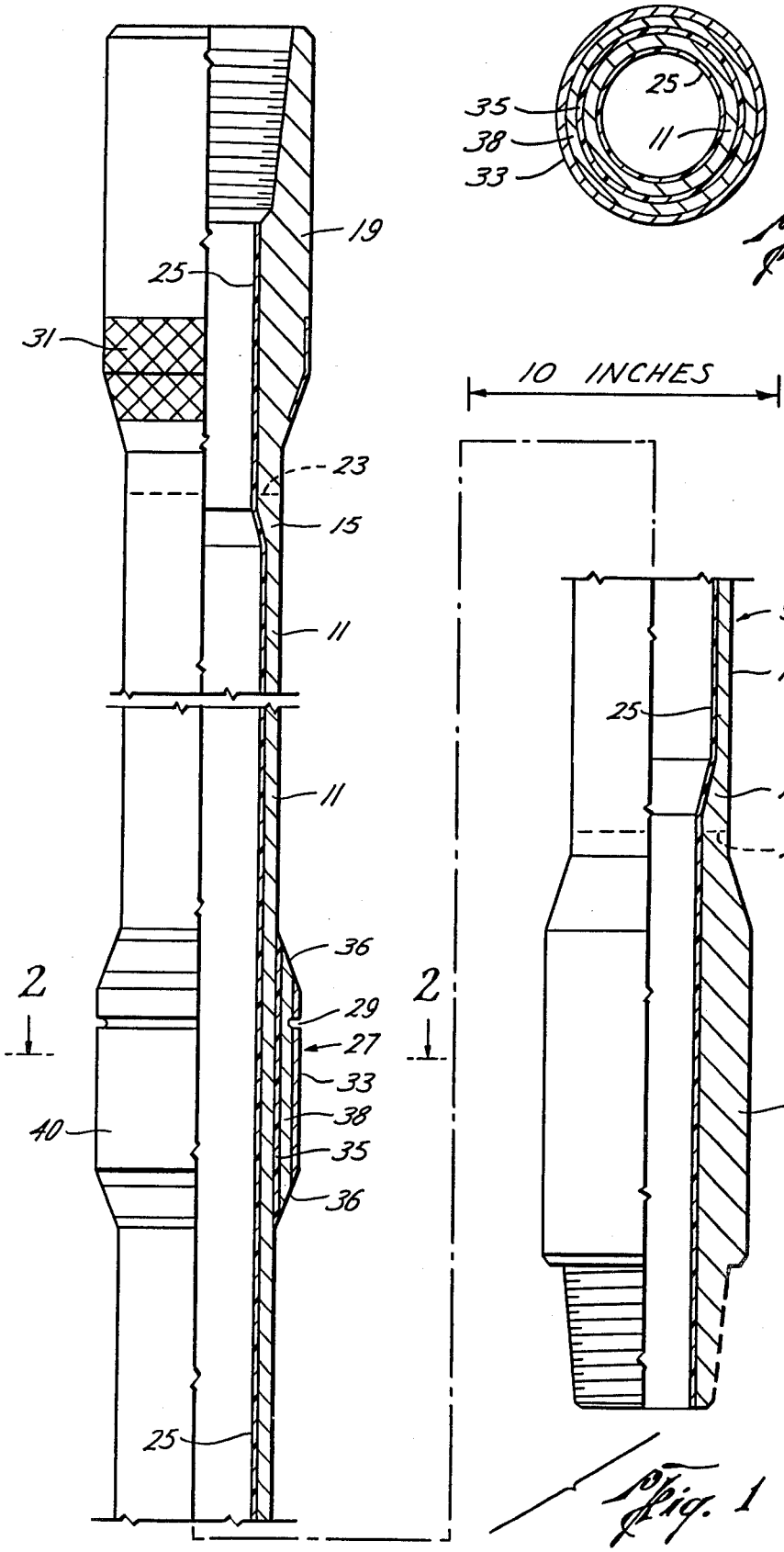

METHOD OF MAKING SLEEVED DRILL PIPE

CROSS REFERENCE TO RELATED APPLICATIONS

This is a continuation of application Ser. No. 183,290, filed Sept. 2, 1980, now abandoned which was a division of application Ser. No. 010,235, filed Feb. 8, 1979, now abandoned, application Ser. No. 10,235 was then pending a continuation-in-part of allowed U.S. patent application Ser. No. 818,672 filed July 25, 1977 by William R. Garrett, entitled Drill Pipe Wear Belt Assembly, now U.S. Pat. No. 4,146,060, issued Mar. 27, 1979 the disclosure of which is incorporated in the present application by reference.

U.S. patent application Ser. No. 904,902 filed May 11, 1978, now U.S. Pat. No. 4,171,560 issued Oct. 23, 1979 is a division of the aforementioned application Ser. No. 818,672.

BACKGROUND OF THE INVENTION

This invention pertains to drill pipe used in rotary drilling of the earth and more particularly to such drill pipe incorporating a sleeve thereabout to protect the pipe against wear.

A description of the prior art of drill pipe protectors appears in the aforementioned U.S. Pat. No. 4,146,060.

The process of centrifugally casting metals such as steel and of such casting incorporating two different materials, i.e. dual metal centrifugal casting is known and is described for example in a publication constituting the general catalog of the Industrial Products Division of United States Pipe and Foundry Company, bearing the notation "10-75" on the back thereof.

The aforementioned catalog describes various applications of dual casting, for example, on pages 23-24 is described a roll shell having an exterior of "Alloy 250", which is a hard alloy steel, and an interior of ductile iron, the shell being shrink fitted to a mandrel to produce a roll. Other applications are described.

A search relative to differential casting for the purpose of incorporating solid hard particles, e.g. tungsten carbide, in the outer surface of a tool joint or drill pipe protector resulted in the following references to U.S. patents:

| | | | |
|---|---|---|---|
| 1,954,892 | Russell et al | 3,103,722 | Whitehurst |
| 2,129,382 | Diwowarsky | 3,175,260 | Bridewell et al |
| 2,207,150 | Hirsch et al | 3,468,997 | Pickels |
| 2,262,983 | Woods | | |

A search relative to smooth hard faced tool joints resulted in the following references to U.S. patents:

| | |
|---|---|
| 3,989,554 | 3,380,861 |
| 1,496,979 | 3,819,364 |
| 3,092,491 | 3,067,593 |
| 3,215,510 | 2,833,638 |
| 3,260,579 | 3,790,353 |

See also brochure of Reed Tool Company: "We're Wearing Out Casing So You Won't.

Other patents relating to hard facing include:

| | | | |
|---|---|---|---|
| 1,924,099 | Bain et al | 3,175,427 | Bridwell et al |
| 2,033,638 | Owen | 3,258,817 | Smiley |
| 3,127,945 | Bridwell et al | 3,293,012 | Smiley |
| 3,128,165 | Bridwell et al | 3,301,645 | Smiley |
| 3,149,411 | Smiley et al | 3,301,673 | Smiley |
| 3,175,260 | Bridwell et al | | |

SUMMARY OF THE INVENTION

According to the invention a circumferentially homogenous sleeve is secured to the outer periphery of a drill pipe. Since the sleeve is circumferentially homogenous, as compared to split sleeves known in the prior art, it is centrifugally cast of two metals including a strong tough inner metal and a hard, non-abrasive wear resistant outer material which preferably is homogenous and has a smooth outer periphery. The sleeve, the inner diameter of which is smaller than the outer diameter of the tool joint members, is secured to the drill pipe tube before one or both tool joint members are attached. The sleeve fits closely about the pipe and is secured thereto, e.g. by a layer of plastics material or elastomeric material or other adhesive high polymeric material, such as epoxy, there being a sufficient thickness of such high polymeric material as to prevent stress concentrations at the ends of the sleeve and to prevent electrolytic corrosion between the sleeve and pipe.

As set forth in U.S. Pat. No. 4,146,860, such layer of adhesive high polymeric material may have a thickness in the range of 1/6 to ¼ inch.

An advantage of the centrifugally cast dual metal sleeve is that the wear resistant portion can be as thick as desired, e.g. ¼ inch radially over the whole length of the sleeve, whereas hard metal applied over the whole sleeve usually cannot exceed 3/32 inch without fretting off in use. Also, to provide a smooth surface with applied hard metal, it is usually necessary to coat the hard material with a layer of smooth non-abrasive metal. In other words, the dual centrifugal casting makes it practical to provide a deep layer of non-abrasive wear resistant material on the outer surface of the sleeve along its full length.

BRIEF DESCRIPTION OF THE DRAWINGS

For a further description of a preferred embodiment of the invention reference will be made to the accompanying scale drawings (FIG. 3 is approximately to scale and about full size).

FIG. 1 is a half section through a drill pipe incorporating the invention,

FIG. 2 is a section to the same scale taken at plane 2—2 of FIG. 1; and

Figure 3:
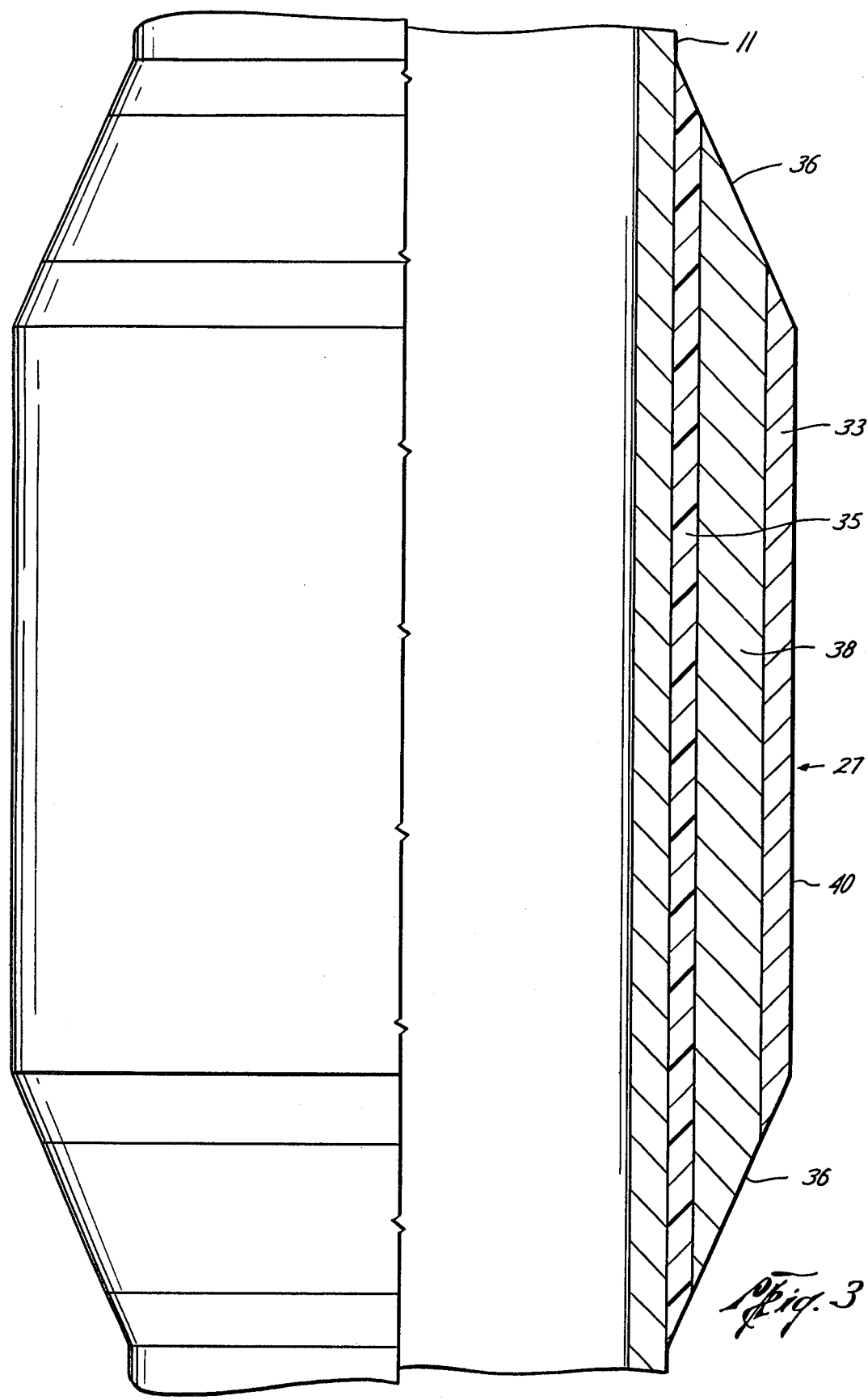
FIG. 3 is a fragmentary view, similar to FIG. 1, but to a larger scale, showing the mid-portion of the pipe to which the sleeve is attached, the internal plastic coating and the wear indicator groove being omitted, however, to exemplify the possibility of such omissions.

The drawings employ the conventions of the U.S. Patent Office to show materials, the metal portion being iron or steel and the plastics portion being preferably epoxy or other high polymer plastics material.

DESCRIPTION OF PREFERRED EMBODIMENT

Referring to the drawings, there is shown a drill pipe 9 including a steel tube 11 having internally upset ends 13, 15 to which pin and box tool joint members 17, 19 are friction welded at 21, 23. The tube and tool joints may be plastic coated internally as shown at 25. A homogeneous metal wear sleeve 27, which may have a wear indicating groove 29 in its outer periphery, is secured to the outer periphery of the tube.

Box tool joint member 19 is provided with wear resistant bands of hard facing 31 over the portions adjacent the juncture of the 18 degree tapered elevator shoulder and cylindrical tonging surface. The hard facing may be particles of crushed sintered tungsten carbide embedded in a matrix of weld metal and coated with a layer of metal to provide a smooth non-abrasive surface, e.g. as described in the aforementioned brochure.

Wear sleeve 27 is also provided with a wear resistant material 33 at its outer surface but this is assembled in a different way from hard facing 31. Sleeve 27 is secured to tube 11 by means of a high polymer adhesive material such as epoxy 35. The ends of the sleeve are bevelled as shown at 36, to facilitate movement of the pipe up and down a well bore or cased hole.

The construction of the drill pipe thus far is substantially the same as that of the drill pipe of the aforementioned Pat. No. 4,146,060 to which reference is made for further details such as, for example, the dimensions, the materials of the tube, tool joint members, plastics internal coating, plastics securement means, and hard facing and the method of assembly.

At the present time, it is preferred to mold the plastics material securement means by the use of split annular molds placed at each end of the sleeve. The plastics material, e.g. liquid, self-curing, exothermic reacting, epoxy is injected into a mold at one end through an injection tube to cause it to flow into the space at between the tube and the sleeve, and continuing the injection until the plastics material flows out the mold at the other end into an overflow tube. The injection and overflow tubes are themselves made of plastics material. The plastics material is then heated to accelerate the cure and any shinkage is accommodated by back flow from the injection and overflow pipes and the latter are cut off and discarded when the curing is complete.

According to the present improvement in the invention, sleeve 27 is a dual metal centrifugal casting, including other shell 33 of hard wear resistant metal, such as alloy steel, and inner shell 38 of tough metal such as ductile iron. It is by virtue of the fact that sleeve 27 is azimuthally homogenous that it is possible for it to be made by centrifugal casting. The cylindrical outer periphery 40 of the wear shell 33 is smooth, as compared to the surface often provided, e.g. by some forms of carbide hard facing and carbide wear inserts, thus reducing the possiblity of wearing a hole in the well casing as the drill pipe is rotated and moved lengthwise when the drill pipe is run in a cased hole.

Centrifugally cast metal is readily distinguishable from other metal. For example, on page 22 of the aforementioned catalog there is shown a cross-section through a dual metal roll including a core of gray iron with 3.2 percent carbon and 2.10 percent of silicon and an outer layer of chill iron having 3.6 percent carbon, 0.3 percent silicon, and 1.0 percent chromimum. It is seen from the cross-section that the grain lines form a pattern of concentric circles about the roll axis, which is the axis of centrifugal casting.

As for the nature of the intra-material joint in a dual metal casting, the catalogue states at page 19:

"One question frequently raised by those initially considering the use of dual metals is that concerned with the continuity and soundness of the bond or fusion between the two layers. In practice, for most metal combinations, and adequate bond is assured. A wiping action between the outer solid layer and the newly poured inner molten metal, the flow of the inner molten metal over the outer layer in a horizontal direction, and centrifugal force pressing it outward against the outer metal result in a fusion or welding between the two layers. With such a bond, bend and shear tests invariably show failure in one or the other of the two metals rather than at the bond."

and at page 20 the catlogue states:

"Dual metal contrifugal casting. Such products consist of two centrifugally cast, concentric layers of different metals or metal compositions with such layers bonded together in the casting operation. In principle, the castings are made by pouring the first or outer metal into a horizontal spinning mold, protecting its I.D. surface against oxidation and scruff accumulation, waiting until the I.D. surface has just solidified, and then, without interruption of spinning, pouring the second or inner metal onto the first."

By virtue of the metallurgical bond generated at the bi-metal interface, and integral hollow cylinder is produced which at its inner and outer surfaces has widely dissimilar properties, not available in a single metallic alloy.

As one means of providing longer tubular shapes, centrifugally cast metal billets have either been hot extruded or hot rotary-forged to lengths of twenty feet or more. The quality of bond in the casting was adequate to permit a tenfold extension in length over the cast billet, the thickness ratio of the two metals remaining constant.

The basic advantage of a dual metal casting is that it provides in one integral structure the opportunity to use materials which either could not be used alone or if used alone would have inherent limitations. As a case in point be cited in metal roll which on its outer surface must have good wear resistance. Such a material, whether it be white iron, a highly alloyed iron (27% chrome-2.5% carbon for example), a nitrided or carburized steel, must be backed up by a softer and tougher material to permit its use. If a casehardened steel shell is used, the thickness of case is limited and requires rehardening of the surface at intervals. In a single metal chill casting, the control of the depth and uniformity of hardness of the chill layer presents basic difficulties. In a centrifugally cast dual metal roll, the outer wear-resistant metal and the core metal are melted separately and hence tailored to perform their specific functions. The thickness and hardness of the wear resistant layer is predetermined and readily controlled an the quality of the bond prevents separation.

As is to be expected, dual metal castings have certain limitations. The relative importance of these is dependent on the end use to which the product is put. Also, as more experience is gained some of the limitations can either be removed or mitigated to a point where they are not important. The following limitations are recognized:

a. Some interdendrite micro-shrinkage is present at the inner surface of the outer metal. The condition is inherent to virtually all single metal centrifugal castings at and near their I.D. surface. Its magnitude is dependent on (1) the cross-wall temperature gradient prevailing during freezing (the steeper the gradient the shallower the void zone), on (2) the nature of the alloy being cast with respect to its liquidus-solidus range (either a pure metal or a eutectic alloy shows almost no void zone) and on (3) wall section. In the steel alloys commonly used this void zone extends only a few hundredths of an inch inward from the inner as-cast surface; as we probe inward, the voids progressively get smaller and disconnected and then disappear. At the very inner surface of the outer layer the second metal while being poured fills the voids which are accessible to it. If the casting is subsequently hot worked (e.g. extruded or rotary-forged) the disconnected, small voids weld shot.

There is no case on record to indicate that this void zone adversely affects performance of the dual metal part. The likely reasons for this fact is that no gross voids are present and the small ones that do exist are not in a location where they influence the designed performance of the part.

b. A small amount of metal, dissolved from the inner surface of the outer metal, gets into the inner layer of metal.

Again this is inherent in the process, since such a solution effect is necessary to attain the desired bond between the two metals. This solution effect is held to an innocuous level by tailoring the chemistry of the two metals. Only rarely would a situation be encountered in which the metal dissolved from the outer layer would affect the analysis of the inner layer seriously enough as to impair its serviceability.

c. In many dual metal products, the coefficient of thermal expanison of the two metals is dissimilar. Where the two alloy layers possess widely different coefficients of thermal expansion, and in addition cyclic heating into intermediate and high temperatures is involved, higher stresses are generated than with a single metal counterpart. If these stresses exceed the yield strength, each cycle results in a small permanent dimensional change. For service applications encountered to date, no difficulties from this source have arisen. It is recognized, however, that for some metal combinations and certain services, the difference in thermal expansion can be an obstacle. The problems are quite similar to those encountered in cladplate materials.

d. Certain dual metal products present heat-treatment problems.

When the product requires heat-treatment, compromises sometimes have to be made. An illustrative instance might be a dual metal tube consisting of a low alloy outer layer and an 18–8 (Type 204) stainless inner layer. If the ultimate in corrosion resistance is desired in the stainless layer, the tube requires a water quench and consequently the outer steel layer will show increased strength and lowered ductility. Conversely, if maximum ductility is desired in the outer low alloy steel, corrosion resistance of the inner stainless is somewhat impaired. Compromises by way of adjustment of the chemistry of either the inner or outer metal, or both, and in heat treatments applied, have proven effective in those cases where they were thought to be needed.

e. Weldments in dual metal castings. Dual metal structures containing a non-weldable component such as abrasion-resistant materials are readily joined by limiting the welding operation to the steel component of the composite casting. When austenitic stainless steels are one of the metal layers, the welding practices published for comparable clad metal plate structures are employed effectively. These techniques require more care and skill than when single metals of similar analysis are joined. "

From the foregoing, it appears that due to solution of the frozen outer metal into the hot melt of the inner metal and/or vice-versa, and due to the hot liquid of the inner metal filling cavities in the inner surface of the frozen outer metal, a combination mechanical and weld bond exists at the interface between the two materials.

After the sleeve is cast, the interior and ends will be machined to size and prepare as described in the parent application, as required for securement to the tube of the drill pipe. The outlet surface of the sleeve will be ground smooth.

Depending upon the materials selected for the sleeve, it may or may not require any heat treatment or hot or cold working.

Certain numerical and other parameters may be given for the wear sleeve. A radial thickness of over 3/32 inch is preferable, a range of 150 to ⅜ inch being most practical, e.g. ¼ inch as shown in FIG. 3. The outer shell may have a hardness over 450 Brinell, e.g. 50–75 Rockwell C, and the inner shell may have a hardness less than 450 Brinell, e.g. 100–350 Brinell. The outer shell may, for example, be made of an alloy steel hardenable by heat and qunech treatment, such as the steels used for tool joints (see U.S. Pat. No. 3,067,593 to McCool) or white iron or "Alloy 250" referred to in the catalogue. The inner shell may, for example, be made of carbon steel such as the steel used for the tubes of drill pipe (see aforementioned U.S. Pat. No. 3,067,593) or ductile iron or "Ductile Ni-Resist" as referred to in the catalogue. The outer periphery of the sleeve may have roughness of less than 500 microinches.

While preferred embodiments of the invention have been shown and described, modifications thereof can be made by one skilled in the art without departing from the spirit of the invention.

I claim:

1. Method of making a drill pipe comprising the steps of
    (1) centrifugally casting a metal shell inside a harder metal shell to form a circumferentially and axially homogeneously continuous wear sleeve,
    (2) placing the wear sleeve over the outside of an axially homogeneously continuous metal tube that is of smaller outer diameter than the inner diameter of the sleeve and that is longer than the sleeve and positioning the sleeve with its ends spaced from the ends of the tube and sealing between each end of the sleeve and the tube,
    (3) flowing fluent high polymeric adhesive material between the sleeve inner periphery and the outer periphery of the tube to form a layer extending continuously from one end of the sleeve to the other and curing the adhesive material in situ while the layer continues to extend from one end of the sleeve to the other to form a molded layer of polymeric material separating the sleeve and tube the full length of the sleeve,
    (4) at any time securing to one end of the tube a tool joint having an outer diameter larger than said inner diameter of the sleeve, and
    (5) at any time after step (2) securing to the other end of the tube a second tool joint having an outer diameter larger than said inner diameter of the sleeve.

* * * * *

UNITED STATES PATENT AND TRADEMARK OFFICE
CERTIFICATE OF CORRECTION

PATENT NO. : 4,458,404

DATED : JULY 10, 1984

INVENTOR(S) : WILLIAM R. GARRETT

It is certified that error appears in the above—identified patent and that said Letters Patent is hereby corrected as shown below:

Column 1, line 9; change "abandoned, application" to -- abandoned. Application --; delete "then pend-".

Column 1, line 10; delete "ing"; before "allowed" insert -- then copending --.

Column 1, line 49; change "Bridewell" to -- Bridwell --.

Column 1, line 68; change "2,033,638" to -- 2,833,638 --.

Column 2, line 30; change "1/6" to -- 1/16 --.

Column 3, line 31; delete "at".

Column 4, line 1; change "and" to -- an --.

Column 4, line 22; change "and" to -- an --.

Column 4, line 37; after "point" insert -- might --; after "cited" delete "in" and insert -- a --.

UNITED STATES PATENT AND TRADEMARK OFFICE
CERTIFICATE OF CORRECTION

PATENT NO. : 4,458,404           Page 2 of 2
DATED      : JULY 10, 1984
INVENTOR(S) : WILLIAM R. GARRETT It is certified that error appears in the above—identified patent and that said Letters Patent is hereby corrected as shown below:

Column 4, line 52; change "an" to -- and --.

Column 6, line 12; after "application," insert -- , S.N. 818,672, now U.S. Pat. No. 4,146,040 --.

Column 6, line 20; delete "150" and insert -- 1/8 -- .

Column 6, line 27; change "qunech" to -- quench --.

Signed and Sealed this

Twenty-second Day of January 1985

[SEAL]

Attest:

DONALD J. QUIGG

Attesting Officer    Acting Commissioner of Patents and Trademarks